US012037120B2

(12) United States Patent
Dowty et al.

(10) Patent No.: US 12,037,120 B2
(45) Date of Patent: Jul. 16, 2024

(54) PASSENGER RESTRAINTS FOR REDUCING SPINAL TENSION (71) Applicant: B/E Aerospace, Inc., Winston-Salem, NC (US)

(72) Inventors: Mark B. Dowty, Rural Hall, NC (US); Joseph S. Sikorski, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 30 days.

(21) Appl. No.: 17/707,689

(22) Filed: Mar. 29, 2022

(65) Prior Publication Data
US 2023/0312098 A1 Oct. 5, 2023

(51) Int. Cl.
*B64D 11/06* (2006.01)
*B60R 22/18* (2006.01)

(52) U.S. Cl.
CPC .... *B64D 11/062* (2014.12); *B60R 2022/1818* (2013.01)

(58) Field of Classification Search
CPC . B60R 2022/1818; B60R 22/32; B60R 22/36; B60R 22/4676; B60R 22/41; B64D 11/062
USPC ....... 297/472, 471, 473, 480, 478, 470, 474, 297/476, 475, 464
See application file for complete search history.

(56) References Cited

U.S. PATENT DOCUMENTS

| | | | | |
|---|---|---|---|---|
| 3,620,569 A | * | 11/1971 | Mathis | B60R 22/26 297/478 |
| 4,063,777 A | * | 12/1977 | Takada | B60R 22/405 242/384 |
| 4,923,147 A | * | 5/1990 | Adams | B64D 25/02 244/122 AG |
| 5,294,183 A | * | 3/1994 | Wetter | B60R 22/14 297/472 |
| 5,823,627 A | | 10/1998 | Viano et al. | |

(Continued)

FOREIGN PATENT DOCUMENTS

| | | |
|---|---|---|
| AT | 13503 U1 | 11/1971 |
| DE | 102017124349 A1 | 4/2019 |

(Continued)

OTHER PUBLICATIONS

Extended European Search Report dated Sep. 13, 2023; European Application No. 23163973.3.

*Primary Examiner* — Milton Nelson, Jr.
(74) *Attorney, Agent, or Firm* — Suiter Swantz IP (57) ABSTRACT

For a vehicle seat, for instance an aircraft passenger seat, a seat belt system including a seat belt reel having a rotating shaft, a seat belt wound on the rotating shaft, and a lock for locking at least one of the rotating shaft and the seat belt. At least one sensor is operative to output a signal when a sensed parameter exceeds a predetermined magnitude threshold. An activation device is operative to activate the lock. A time delay device electrically coupled to the at least one sensor and the activation device is operative to, upon receiving the signal output by the at least one sensor, activate the activation device upon completion of a time delay after receiving the signal output by the at least one sensor. Further embodiments include shoulder belts forming loops allowing a predetermined amount of forward travel prior to restraining a passenger.

5 Claims, 5 Drawing Sheets (56) References Cited

U.S. PATENT DOCUMENTS

| | | | |
|---|---|---|---|
| 6,135,561 A | 10/2000 | Krueger et al. | |
| 6,145,881 A | 11/2000 | Miller, III et al. | |
| 6,499,554 B1 * | 12/2002 | Yano | B60R 22/46 |
| | | | 297/480 |
| 7,673,906 B2 | 3/2010 | Bell | |
| 7,905,514 B2 | 3/2011 | Thomas | |
| 10,407,176 B2 | 9/2019 | Meadows et al. | |
| 10,518,740 B2 | 12/2019 | Ruthinowski et al. | |
| 10,525,929 B2 | 1/2020 | Ruthinowski et al. | |
| 10,710,548 B2 * | 7/2020 | Jaradi | B60R 22/24 |
| 2009/0115237 A1 | 5/2009 | Whalen et al. | |
| 2012/0212029 A1 | 8/2012 | Wada | |
| 2013/0009391 A1 | 1/2013 | Miller et al. | |
| 2020/0079246 A1 | 4/2020 | Jaradi et al. | |
| 2022/0063555 A1 | 12/2022 | Kanegae et al. | |

FOREIGN PATENT DOCUMENTS

| | | |
|---|---|---|
| EP | 1324901 A1 | 7/2003 |
| EP | 1686023 B1 | 3/2008 |
| EP | 1352795 B1 | 8/2008 |
| WO | 2003059707 A1 | 7/2003 |

\* cited by examiner

PASSENGER RESTRAINTS FOR REDUCING SPINAL TENSION

TECHNICAL FIELD AND BACKGROUND

The present disclosure relates generally to vehicle passenger restraints, and more particularly to shoulder harness systems for reducing spinal loads.

Vehicle passenger restraints such as seat belts are designed to prevent serious injury during a sudden deceleration event. Seat belts can be implemented as lap belts, shoulder belts, and combinations thereof forming multipoint harnesses. Sophisticated seat belts can include pretensioners and load limiters. Pretensioners are mechanisms configured to retract a seat belt to increase tension when a vehicle decelerates rapidly, while load limiters are mechanisms configured to pay out a seat belt slightly when the tension exceeds a predetermined threshold. The two mechanisms work together to maintain the passenger against the seat while ensuring that the restraining forces acting on the passenger due not rise to a level that would cause injury.

Figure 5:
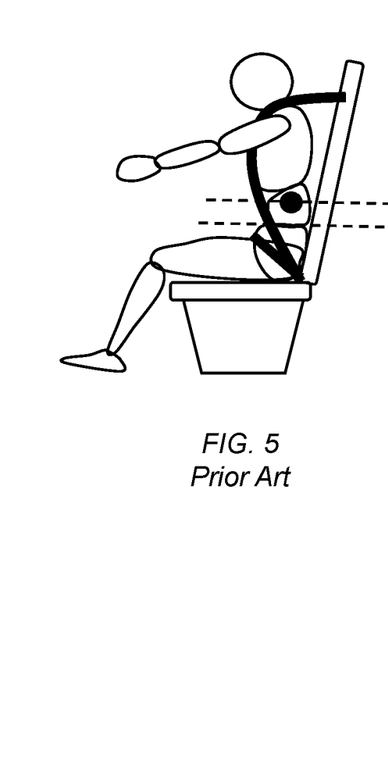
FIG. 5 is a schematic diagram illustrating restrained forward movement during a sudden deceleration event.
Figure 6:
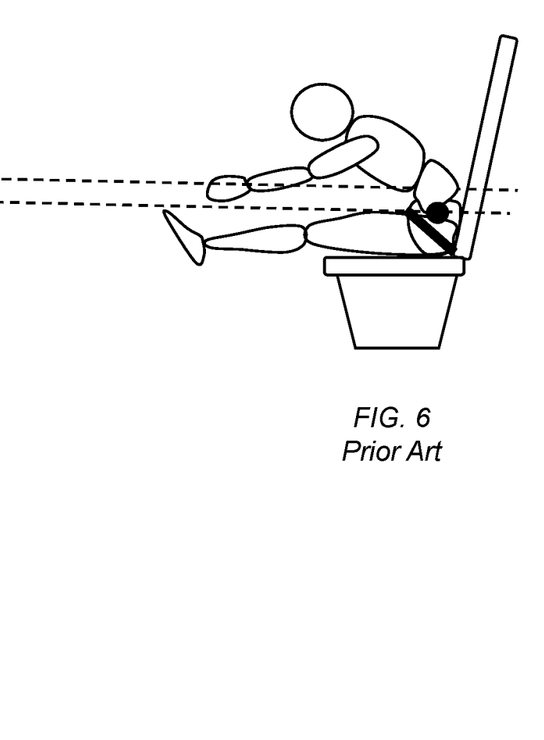
FIG. 6 is a schematic diagram illustrating unrestrained forward movement during a sudden deceleration event.

FIGS. 5 and 6 illustrate examples of aircraft passenger seats equipped with conventional passenger restraints. Referring to FIG. 5, passenger movement in the forward direction can be limited using a shoulder belt, airbags and the back of a forward-positioned seat. Referring to FIG. 6, in the case of a front row of seats or another seat configuration without a reachable forward structure for limiting forward movement, unrestrained movement can cause spinal tension loads that exceed a dangerous threshold. To reduce spinal loads in such seating configurations, shoulder harnesses equipped with pretensioners as discussed above can be added to the seat. However, such devices and complex and transfer significant loads through the seat structure early in the deceleration and, by holding the passenger upright, raise the center of gravity of the passenger further increasing loads on the seat. Increased loads require structural reinforcement of the seat, which adds weight, complexity, and cost to the seat, which is undesirable in aircraft and other applications.

Therefore, what is needed are solutions for reducing spinal tension without the disadvantages and limitations associated with conventional passenger restraints.

BRIEF SUMMARY

Broadly speaking, the present disclosure provides passenger restraint systems configured to initiate significant restraint after the passenger center of gravity has lowered because of forward momentum, as compared to a passenger center of gravity in an upright sitting position, thereby providing a suitable passenger restraint for reducing spinal tension without the need for complex mechanisms and significant structural reinforcement of a seat. Applications for the solutions described herein include, but are not limited to, aircraft and particularly front row seats and seats without any forward structure reachable to limit forward movement.

To achieve the foregoing and other advantages, in a first aspect the present disclosure provides a seat belt system including a seat belt reel including a rotating shaft, a seat belt wound on the rotating shaft, and a lock for locking at least one of the rotating shaft and the seat belt. At least one sensor is operative to output a signal when a sensed parameter exceeds a predetermined magnitude threshold. An activation device is operative to activate the lock. A time delay device, electrically coupled to the at least one sensor and the activation device, is operative to, upon receiving the signal output by the at least one sensor, activate the activation device upon completion of a time delay after receiving the signal output by the at least one sensor.

In some embodiments, the sensed parameter includes at least one of rotational speed of the rotating shaft, pay out speed of the seat belt, rotational acceleration of the rotating shaft, number of rotations of the rotating shaft, and accelerations on a seat or surrounding structure associated with the seat belt system.

In some embodiments, the lock is a reel lock operative to lock the rotating shaft against rotation, the at least one sensor is operative to output the signal when the sensed parameter of the rotating shaft exceeds the predetermined magnitude threshold, the activation device is operative to activate the reel lock, and the sensed parameter includes at least one of rotational speed of the rotating shaft, rotational acceleration of the rotating shaft, and number of rotations of the rotating shaft.

In some embodiments, the activation device is operative to activate the lock to slow rotation of the rotating shaft in an unwind direction during the time delay and stop rotation of the rotating shaft in the unwind direction upon completion of the time delay.

In some embodiments, the sensed parameter of the rotating shaft corresponds to unwinding of the seat belt from the seat belt reel and the time delay is such that at least 15 cm and no more than 90 cm is unwound from the seat belt reel, and more preferably at least 30 cm and no more than 60 cm.

In some embodiments, the time delay is adjustable.

In some embodiments, the seat belt is a shoulder belt.

According to another aspect, the present disclosure provides a vehicle passenger seat including a seat bottom, a seat back, and a passenger restraint. The passenger restraint includes an inertia reel assembly and a seat belt wound on the inertia reel assembly, the seat belt forming a loop disposed outside of the inertia reel assembly. A guide positioned proximate a top of the seat back and the loop is captured by the guide.

In some embodiments, the inertia reel assembly is operative to prevent unwinding of the seat belt responsive to a predetermined rotational acceleration, and the guide is configured to release the captured loop responsive to a force on the guide exceeding a predetermined magnitude threshold force.

In some embodiments, the guide is operative to open or break responsive to the force on the guide exceeding the predetermined magnitude threshold force.

In some embodiments, the loop extends diagonally across a front of the seat back and the seat belt is implemented as a shoulder strap.

In some embodiments, the inertia reel assembly includes a spring system operative to progressively increase spring force as the seat belt unwinds from the inertia reel assembly.

In yet another aspect, the present disclosure provides a vehicle passenger seat including a seat bottom, a seat back, and a passenger restraint. The passenger restraint includes an inertia reel assembly and a seat belt wound on the inertia reel assembly, the seat belt forming a loop disposed outside of the inertia reel assembly, wherein the inertia reel assembly and the seat belt are free of attachment to the seat back, and the inertia reel assembly is positioned to one side of the seat back proximate a bottom of the seat back.

In some embodiments, the inertia reel assembly is operative to prevent unwinding of the seat belt responsive to a predetermined rotational acceleration, and the loop is implemented as a shoulder strap and has a length sufficient to permit forward movement of a wearer of the seat belt away from the seat back a distance of at least 15 cm and no more than 90 cm, and preferably at least 30 cm and no more than 60 cm.

In some embodiments, the inertia reel assembly includes a spring system operative to progressively increase spring force as the seat belt unwinds from the inertia reel assembly.

Embodiments of the inventive concepts may include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Assemblies, devices, systems, and methods are described in the following for adjustably delaying the response of a passenger restraint following a triggering event such as a sudden deceleration event. Time delays of the passenger restraint are achieved using at least one of controllers, devices and mechanical configurations and are predetermined to prevent immediate restraint following a qualifying deceleration event. The described can be utilized to allow a predetermined amount of forward travel of a passenger, to lower the passenger's center of gravity as compared to a passenger's center of gravity when in an upright sitting position, before restraining the passenger against further forward movement. Benefits of the embodiments described herein include, but are not limited to, reducing spinal loads on the passenger and a reduction in the required structural reinforcement of the seat associated with the passenger restraints. Applications for the embodiments described herein include, but are not limited to, aircraft passenger seats positioned spaced apart from forward movement limiting structure, for instance front row seats and exit row seats.

Figure 1:
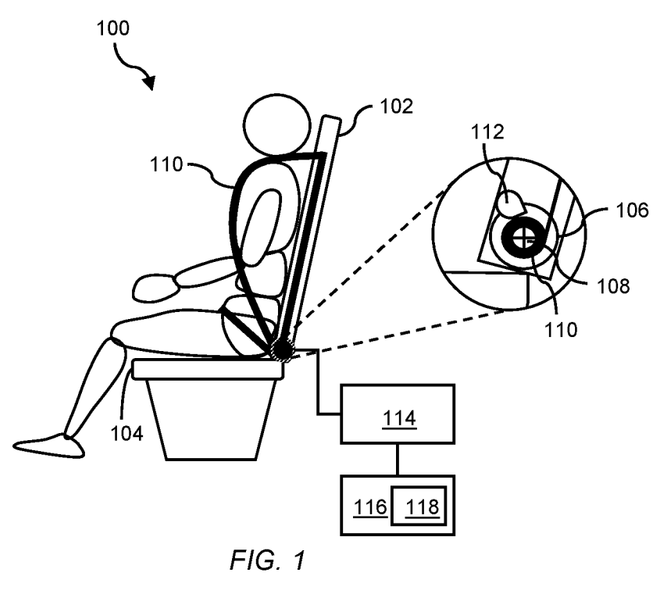
FIG. 1 is a schematic diagram illustrating a passenger restraint, according to the present disclosure, in use prior to a sudden deceleration event.
Figure 2:
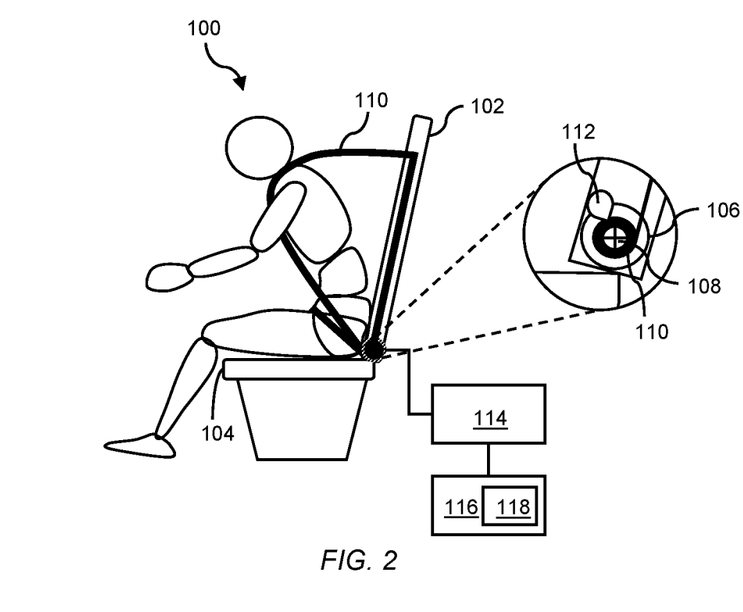
FIG. 2 is a schematic diagram illustrating the passenger restraint of FIG. 1, in use during a sudden deceleration event.

FIGS. 1 and 2 depict diagrams representing a passenger restraint system 100 according to the present disclosure. The system 100 is compatible for use with various passenger seats generally including a seat back 102 and a seat bottom 104, not limited to any design, configuration, or capabilities. Non-limiting examples of passenger seats include economy and business class aircraft seats. The system 100 generally includes a seat belt reel 106 including a rotating shaft 108, a length of seat belt 110 wound on the rotating shaft, and a reel lock 112 operative for locking the rotating shaft against rotation upon the occurrence of a sudden deceleration event. For example, the reel lock may include a pawl operative to engage a toothed gear affixed to the shaft. In some embodiments, the seat belt 110 is implemented as a shoulder belt or cross-chest belt and may be used with or without an attached lap belt forming a three-point harness. In some embodiment, the lock acts directly on the seat belt webbing to prevent further unwinding or pay out from the reel.

The seat belt reel 106 is communicatively coupled to at least one sensor 114 operative to output a signal when a sensed parameter of the rotating shaft 108 exceeds a predetermined magnitude threshold. For example, the sensed parameter may include at least one of rotational speed of the rotating shaft, rotational acceleration of the rotating shaft, and number of rotations of the rotating shaft, associated with an unwinding direction of the seat belt. In some embodiments, the at least sensor 114 is acceleration sensor associated with the seat or other structure. An activation device 116 is operative to activate the reel lock 112 to lock the rotating shaft 108 against rotation to prevent further unwinding or pay out of the seat belt 110. A time delay device 118, electrically coupled to the at least one sensor 114 and in some embodiments an element of the activation device 116, is operative to, upon receiving the signal output by the at least one sensor 114, activate the activation device 116 upon completion of a time delay after receiving the signal output by the at least one sensor 114, as discussed further below.

In this configuration, an amount of unwinding of the seat belt 110 is allowed such that a predetermined amount of forward travel of the passenger occurs, during the time delay, before the activation device 116 activates the reel lock 112 to prevent further forward travel of the restrained passenger. As mentioned above, the allowed amount of forward travel lowers the center of gravity of the passenger before restraint is completed. In some embodiments, the time delay is adjustable. In some embodiments, the activation device 116 is operative to activate the reel lock 112 to first slow rotation of the rotating shaft 108 in an unwind direction during the time delay, and stop rotation of the rotating shaft in the unwind direction upon completion of the time delay.

In some embodiments, the sensed parameter of the rotating shaft 108 corresponds to unwinding of the seat belt 110 from the seat belt reel 106 and the time delay is such that at least 15 cm and no more 90 cm of the seat belt is unwound from the seat belt reel before additional unwinding is stopped, and preferably at least 30 cm and no more than 60 cm. In any event, the amount of unwound seat belt corresponds to the amount needed to attenuate the spinal tension of a flexible or rigid seat and for a range of occupants. The lesser distance is greater than an amount of pay out of a conventional reel lock before its locking system engages, and the greater distance is less than, and preferably significantly less than, the full capacity of a conventional reel. Such an amount of forward movement allows the upper body of the passenger to move forward, apart from the seat back, toward a folded position but short of a folded over position in which high spinal loads are typically realized.

In some embodiments, the at least one sensor 114 is operative to detect changes in velocity of structures to which the sensors are connected or coupled, such as the components of at least one of the seat belt reel 106, the seat belt 110 and the seat, or other structures in an aircraft passenger cabin or other structures of the aircraft overall such as fuselage and frame elements. The at least one sensor 114 is operative to detect movements corresponding to high G-force events and may include any combination of multi-axis accelerometers, gyroscopes, and magnetometers, among others. In some implementations, accelerometers may be configured measure an amount of acceleration in a particular direction, gyroscopes may be configured to measure changes in orientation or relative velocity, and magnetometers measure changes in magnetic fields that can be used to determine absolute orientation of the elements to which the magnetometers are connected. Because accelerometers, gyroscopes, and magnetometers may be used to measure different features of inertial movement, the sensor outputs may be combined into or may otherwise contribute to connectivity.

In a particular conceived example, the at least one sensor 114 may be a ball and spring type acceleration switch that is generally maintained in a non-conducting condition in which a spring biases a ball from a conducting position. Such switches achieve electrically conducting conditions when actuated by acceleration greater than a predetermined magnitude threshold and return to non-conducting condition when the acceleration reduces below the threshold. The magnitude threshold of each such sensor can be predetermined, for example, by the spring constant of the spring and by the geometry of the device. In such a device, the ball, serving as an inertial mass, moves against the force of the spring to a conducting position to provide connectivity by either direct conduction through the ball or by otherwise engaging or actuating a switch with the ball during an inertial event. Thus, the magnitude threshold can be predetermined by selection of the acceleration sensors used or by adjustment of an acceleration sensors.

By adjustment of the time delay introduced by the time delay device 118, the system 100 can be used in various applications and with various passenger restraints and reel configurations, and customized according to an occupant or occupant range. The adjustable time delay defines a duration threshold, predetermined by adjustment, by which a critical inertial event is determined.

Figure 3:
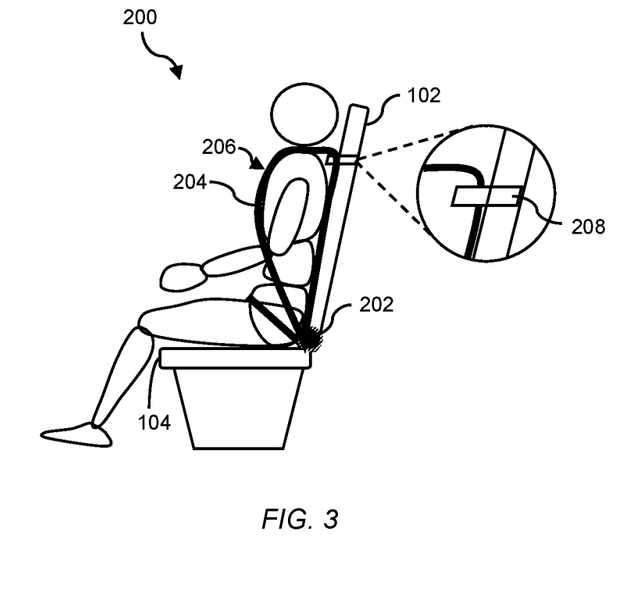
FIG. 3 is a schematic diagram illustrating a passenger restraint, according to the present disclosure, in use prior to a sudden deceleration event.
Figure 4:
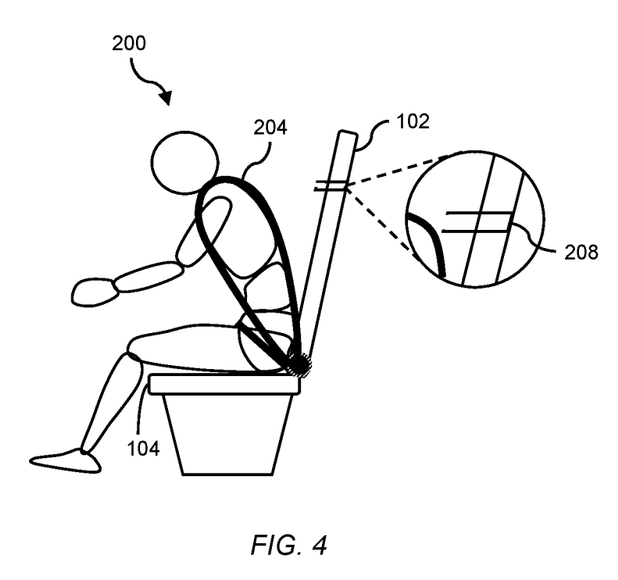
FIG. 4 is a schematic diagram illustrating the passenger restraint of FIG. 3, in use during a sudden deceleration event.

FIGS. 3 and 4 depict an alternative configuration of a passenger restraint system shown generally at 200. The system 200 is compatible for use with various passenger seats also generally including a seat back 102 and a seat bottom 104, not limited to any design, configuration, or capabilities. The system 200 generally includes an inertia reel assembly 202 and a seat belt webbing 204 wound on the inertia reel assembly. The seat belt webbing 204 forms a loop 206 disposed outside of the inertia reel assembly for positioning around the passenger, for instance across the chest, over one shoulder, and across the back. A guide 208 positioned proximate a top of the seat back captures the loop such that the seat belt 204 is routed through the guide.

The inertia reel assembly 202 is operative to prevent unwinding of the seat belt responsive to a predetermined rotational acceleration, and the guide 208 is operative to release the captured loop 206 responsive to a force on the guide exceeding a predetermined magnitude threshold force. In some embodiments, the guide 208 is operative to open, break or otherwise release the captured webbing responsive to the force on the guide exceeding the predetermined magnitude threshold force, thereby releasing the seat belt from capture and permitting the passenger to move forward a predetermined distance apart from the seat back 102 before being restrained completely.

In some embodiments, the inertia reel assembly 202 includes a spring system operative to progressively increase spring force as the seat belt unwinds from the inertia reel assembly. In some embodiments, the inertia reel assembly 202 and the seat belt 204 are free of attachment to the seat back 102, and the inertia reel assembly is positioned to one side of the seat back proximate a bottom of the seat back, for instance attached to a frame member supporting the seat bottom 104.

In some embodiments, the inertia reel assembly 202 is operative to prevent unwinding of the seat belt responsive to a predetermined rotational acceleration of an internal component, and the loop 206 is implemented as a shoulder strap and has a length sufficient to permit forward movement of a wearer of the seat belt away from the seat back 102 a distance of at least 15 cm and no more than 90 cm, more preferably at least 30 cm and no more than 60 cm, thereby allowing the passenger to 'fold over' to a prescribed angle as illustrated in FIG. 4. In some embodiments, the seat belt 204 unwinds to a maximum extent after which the seat belt applies restrains the passenger against further forward movement thereby applying a compressive load to the passenger's spine and reducing the internal tension loads to acceptable levels. In some embodiments, the inertia reel assembly 202 includes a spring system operative to progressively increase spring force as the seat belt 204 unwinds from the inertia reel assembly 202.

It is understood that physical implementations of the passenger restraints according to FIGS. 1-4 and descriptions thereof herein need not appear as in the drawings with regard to placement of real components. Those of ordinary skill in the art recognize that equivalent configurations can vary in physical geometry and construction.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:
1. A vehicle passenger seat, comprising:
a seat bottom;
a seat back;
a passenger restraint, the passenger restraint comprising:
  an inertia reel assembly; and
  a seat belt wound on the inertia reel assembly, the seat belt forming a loop disposed outside of the inertia reel assembly and the loop positioned forward of the seat back; and
a guide mounted to the seat back;

wherein:
the loop is captured by the guide; and
the guide is operative to open or break to release the captured loop responsive to a pulling force on the guide exceeding a predetermined threshold force.

2. The vehicle passenger seat according to claim 1, wherein the inertia reel assembly is operative to prevent unwinding of the seat belt responsive to a predetermined rotational acceleration.

3. The vehicle passenger seat according to claim 1, wherein the loop extends diagonally across a front of the seat back and the seat belt is implemented as a shoulder strap.

4. The vehicle passenger seat according to claim 1, wherein the loop has a length to permit forward movement of a wearer of the seat belt away from the seat back a distance of at least 15 cm and no more than 90 cm.

5. The vehicle passenger seat according to claim 1, wherein the loop has a length to permit forward movement of a wearer of the seat belt away from the seat back a distance of at least 30 cm and no more than 60 cm.

* * * * *